(12) United States Patent
Jhang et al.

(10) Patent No.: US 12,148,236 B2
(45) Date of Patent: *Nov. 19, 2024

(54) OPTICAL SENSOR AND METHODS OF MAKING THE SAME

(71) Applicant: Taiwan Semiconductor Manufacturing Co., Ltd., Hsinchu (TW)

(72) Inventors: You-Cheng Jhang, Hsinchu (TW); Han-Zong Pan, Hsinchu (TW); Wei-Ding Wu, Zhubei (TW); Jiu-Chun Weng, Taipei (TW); Hsin-Yu Chen, Hsinchu (TW); Cheng-San Chou, Hsin-Chu (TW); Chin-Min Lin, Hsinchu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/232,756

(22) Filed: Aug. 10, 2023

(65) Prior Publication Data

US 2023/0401885 A1 Dec. 14, 2023

Related U.S. Application Data

(63) Continuation of application No. 17/993,319, filed on Nov. 23, 2022, which is a continuation of application No. 16/869,314, filed on May 7, 2020, now Pat. No. 11,514,707.

(60) Provisional application No. 62/855,545, filed on May 31, 2019.

(51) Int. Cl.
*G06V 40/13* (2022.01)
*G02B 27/30* (2006.01)
*G06F 3/041* (2006.01)
*G06F 21/32* (2013.01)
*H01L 27/146* (2006.01)

(52) U.S. Cl.
CPC ............. *G06V 40/13* (2022.01); *G02B 27/30* (2013.01); *G06F 3/0412* (2013.01); *G06F 21/32* (2013.01); *H01L 27/14625* (2013.01)

(58) Field of Classification Search
None
See application file for complete search history.

(56) References Cited

U.S. PATENT DOCUMENTS

| 11,256,896 B2* | 2/2022 | Kim ................. G06F 3/0488 |
| 2018/0120149 A1 | 5/2018 | Chung et al. |
| 2018/0260602 A1 | 9/2018 | He et al. |
| 2019/0122025 A1 | 4/2019 | Gove et al. |
| 2019/0157337 A1 | 5/2019 | Lin et al. |
| 2020/0327299 A1 | 10/2020 | Wu et al. |

* cited by examiner

*Primary Examiner* — Nicholas J Lee
(74) *Attorney, Agent, or Firm* — Duane Morris LLP

(57) ABSTRACT

Optical sensors and their making methods are described herein. In some embodiments, a described sensing apparatus includes: an image sensor; a collimator above the image sensor, wherein the collimator includes an array of apertures; and an optical filtering layer above the collimator, wherein the optical filtering layer is configured to filter a portion of light to be transmitted into the array of apertures.

20 Claims, 13 Drawing Sheets

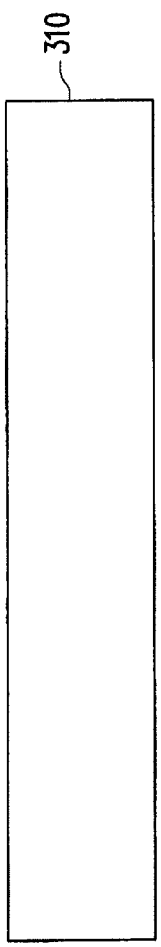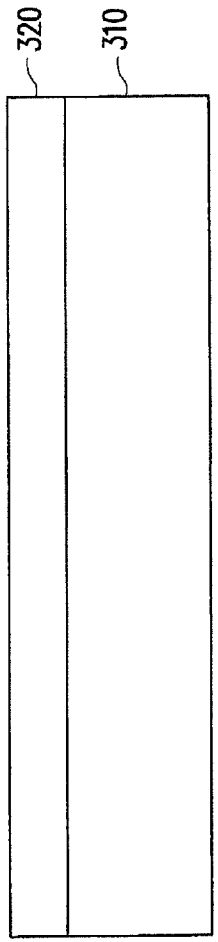
FIG. 3A
FIG. 3B

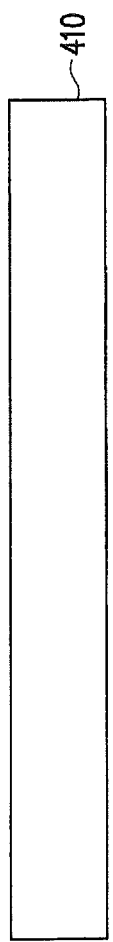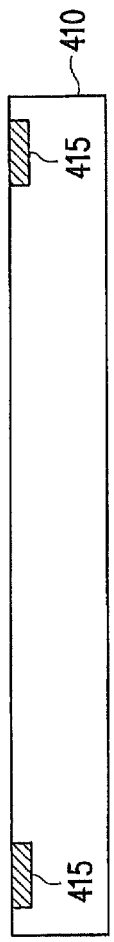

OPTICAL SENSOR AND METHODS OF MAKING THE SAME

CROSS-REFERENCE TO RELATED APPLICATION

This application is a continuation of U.S. patent application Ser. No. 17/993,319, filed Nov. 23, 2022, which is a continuation of U.S. patent application Ser. No. 16/869,314 filed May 7, 2020, now U.S. Pat. No. 11,514,707, which claims priority to U.S. Provisional Patent Application No. 62/855,545, filed on May 31, 2019, each of which are incorporated by reference herein in their entireties.

BACKGROUND

In the course of integrated circuit (IC) evolution, functional density (i.e., the number of interconnected devices per chip area) has generally increased while geometry size (i.e., the smallest component (or line) that can be created using a fabrication process) has decreased. For example, there is considerable interest in providing consumer and/or portable electronic devices (e.g., smart phones, electronic tablets, wearable devices, and so on) with biometric sensors (e.g., optical sensors for fingerprint recognition) inside limited device housing. Surface space is often a particularly limited resource in electronic devices.

To form an optical sensor, e.g. optical finger print sensors, in an electronic device housing, an infrared cut-off filter (IRCF) is typically deposited directly on a complementary metal oxide semiconductor (CMOS) image sensor (CIS) wafer before a trim wafer is fusion bonded to the CIS wafer. Then, a thin-down flow and deep silicon etching is performed to form a silicon microelectromechanical systems (MEMS) structure. The high stress in the IRCF will induce a high bow surface of the IRCF and deposited layers after the IRCF, which makes it more difficult to have a smooth wafer bonding. In addition, the processes after IRCF will impact optical property function by extra thermal and stress effect, which induces charging and stress degradation in the CIS performance as well.

Therefore, conventional means of integrating biometric sensors inside electronic device housing are not satisfactory in all respects.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIGS. 3A, 3B, 3C, and 3D illustrate cross-sectional views of an exemplary MEMS wafer structure during various fabrication stages, in accordance with some embodiments of the present disclosure.

FIGS. 4A, 4B, 4C, and 4D illustrate cross-sectional views of an exemplary CIS wafer structure during various fabrication stages, in accordance with some embodiments of the present disclosure.

DETAIL DESCRIPTION

Figure 1:
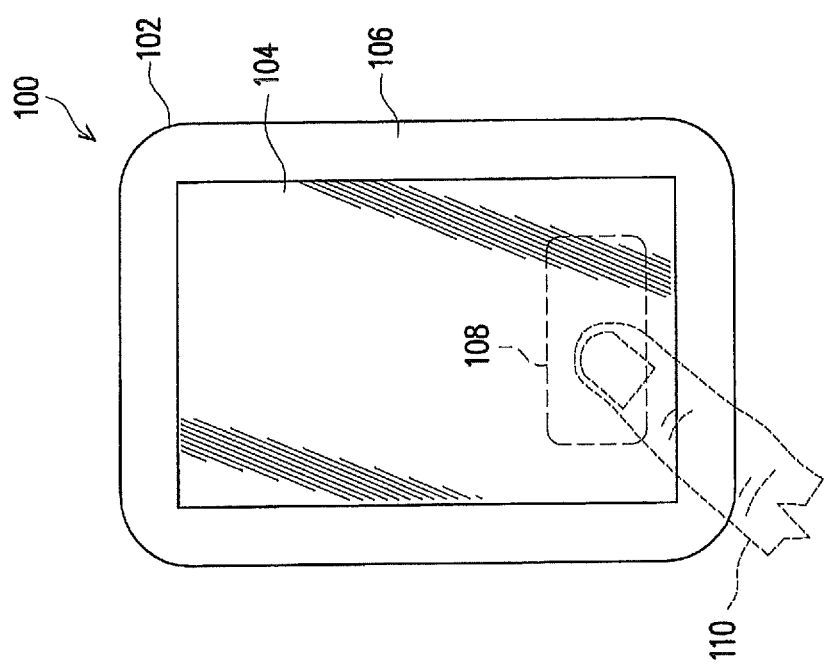
FIG. 1 illustrates an electronic device with a biometric sensing region on surface space, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

Unless otherwise defined, all terms (including technical and scientific terms) used herein have the same meaning as commonly understood by one of ordinary skill in the art to which this disclosure belongs. It will be further understood that term's, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference will now be made in detail to the present embodiments of the disclosure, examples of which are illustrated in the accompanying drawings. Wherever possible, the same reference numbers are used in the drawings and the description to refer to the same or like parts.

The present disclosure is generally related to optical sensors in electronic devices and fabrication of the same.

More particularly, some embodiments are related to methods for integrating silicon (Si) microelectromechanical systems (MEMS) structure and infrared cut-off filter (IRCF) on complementary metal oxide semiconductor (CMOS) image sensor (CIS) devices to make the CIS devices free from degradation induced by charging, stress effect and thermal side effect.

Biometric sensing systems, such as fingerprint recognition systems, have been one approach drawing considerable interest to provide security features to electronic devices, and more particularly, consumer and/or portable electronic devices (e.g., smart phones, electronic tablets, wearable devices, and so on). Biometric sensing systems are based on unique features of a user and may not rely on memorization or the use of other input devices by the user, such as password input. Among various biometric sensing techniques, fingerprint recognition is a reliable and widely used technique for personal identification or verification. A fingerprint recognition system generally includes fingerprint sensing and matching functionalities, such as collecting fingerprint images and comparing those images against known fingerprint information. In particular, one approach to fingerprint recognition involves scanning a reference fingerprint and storing the reference image acquired. The characteristics of a new fingerprint may be scanned and compared to the reference image already stored in a database to determine proper identification of a person, e.g. for verification purposes. A fingerprint recognition system may be particularly advantageous for authentication in consumer and/or portable electronic devices. For example, an optical sensor for acquiring fingerprint images may be carried inside the housing of an electronic device.

The effectiveness and reliability of biometric security systems may be affected by the accuracy with which the unique biometric data is able to be detected. In the case of fingerprint recognition systems, this means improving SNR of the incident light arriving optical sensors and at the same time avoiding performance degradation induced by charging, stress effect and thermal side effect.

According to various embodiments, the present disclosure provides a novel sensing apparatus comprising a MEMS structure above a CIS wafer. The sensing apparatus includes a passive oxide layer over the CIS wafer, where a silicon MEMS structure is bonded onto the passive oxide layer. In addition, the sensing apparatus includes a buried oxide layer over the silicon MEMS structure and an infrared cut-off filter (IRCF) over the buried oxide layer. In one embodiment, the sensing apparatus may include at least one metal pad located outside of a pattern of the IRCF.

According to various embodiments, the present disclosure also provides a novel method for forming a sensing apparatus. In one embodiment, a first wafer including a MEMS structure and a second wafer including a CIS structure are formed separately. Then an alignment fusion bonding is performed to bond the first wafer onto the second wafer, such that the MEMS structure is above the CIS structure after the bonding. An IRCF may be formed with a pattern on the bonded MEMS/CIS wafer. The CIS structure may include at least one metal pad outside of the IRCF pattern. While a value or range may be used in some embodiment of the following description, other values and ranges are within the scope of this disclosure.

FIG. 1 illustrates an electronic device 100 with a biometric sensing region on surface space, in accordance with some embodiments of the present disclosure. As shown in FIG. 1, the electronic device 100 is illustratively a mobile wireless communication device (e.g., a smart phone). In other embodiments, the electronic device 100 may be any other suitable electronic device, such as a laptop computer, an electronic tablet, a portable gaming device, a navigation device, or a wearable device. The electronic device 100 includes a housing 102 together with other components, such as processor(s) and memories, inside the housing 102. A display panel 104 is carried by the housing 102. In the illustrated embodiment, the display panel 104 is an organic light-emitting diode (OLED) display panel. In various embodiments, the display panel 104 may be any other suitable type display panel, as will be appreciated by those skilled in the art, such as liquid-crystal display (LCD) panel, light-emitting diode (LED) display panel, or active-matrix organic light-emitting diode (AMOLED) display panel.

In the illustrated embodiment, the display panel 104 expands substantially to the entire surface space of the electronic device 100. Some margins between the display panel 104 and edges of the housing 102 may be left for bezel panels 106. The display panel 104 stacks above image sensing features for fingerprint detection, or other suitable biometric sensing features. The image sensing features will be described further in details later. The display panel 104 acts as both a display and an input device through which the image sensing features acquires fingerprint images. As such, the display panel 104 performs multiple device functions in response to user input. For example, the display panel 104 may first display a prompt (e.g., a finger icon or an instruction text) on screen when the electronic device 100 is in a lock status. The display panel 104 may further highlight a sensing region 108. When a user's finger 110 or another suitable object is placed inside the sensing region 108, in either near field or in direct contact with the display panel 104, the image sensing features are activated and acquire biometric data (e.g., a fingerprint image) from the user's finger 110. Such biometric data is sent to processor(s) for matching and/or spoof detection. If the biometric data matches a reference fingerprint image stored in memories, the electronic device 100 may thereafter transit into an unlock status, and the display panel 104 starts to show desktop icons or response to various other user inputs. The display panel 104 may further integrate with touch sensor arrays. In such case, the display panel 104 is also a touch display panel.

Figure 2:
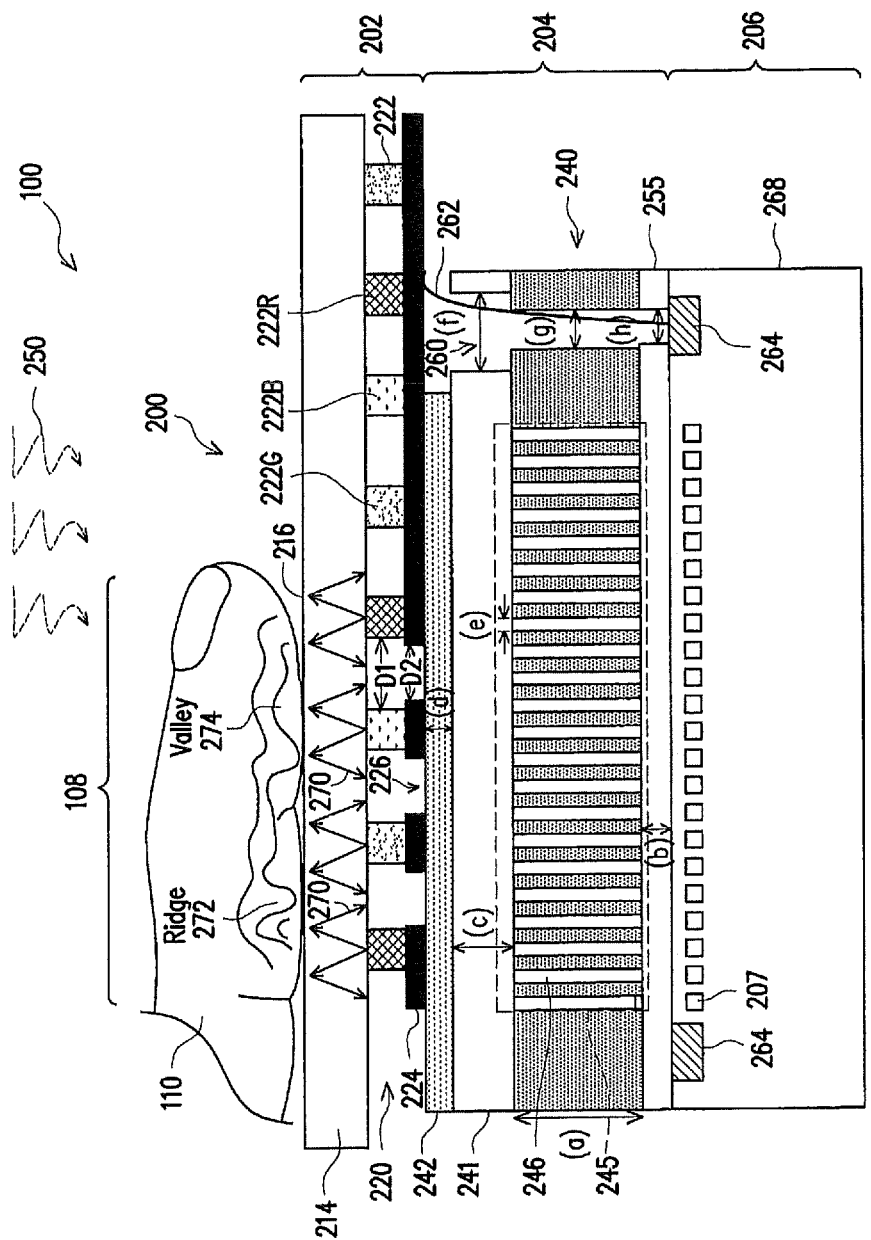
FIG. 2 is a cross-sectional view of an electronic device integrated with an optical sensor under a display panel, in accordance with some embodiments of the present disclosure.

FIG. 2 is a cross-sectional view of a portion of the electronic device 100. This portion of the electronic device 100 carries the fingerprint recognition function and can be regarded as a fingerprint recognition system 200. The fingerprint recognition system 200 is in a stack-up configuration, including a display panel 202 on the top, a light conditioning layer 204 in the middle, and an image sensing layer 206 at the bottom. The display panel 202 illuminates the sensing region 108 above. When light emitted from the display panel 202 is reflected from the user's finger 110 or other suitable objects, the reflected light travels downwardly through the display panel 202 and the light conditioning layer 204 and eventually arrives at the image sensing layer 206. In one embodiment, the image sensing layer 206 includes one or more optical sensing elements 207, such as complementary metal oxide semiconductor (CMOS) sensors and/or charged coupled device (CCD) sensors. The optical sensing elements 207 are capable of detecting intensities of the incident light. The image sensing layer 206 thereby convers the incident light into a pixel image, which includes biometric characteristics of the user's finger 110. Each pixel of the pixel image may correspond to intensity of the incident light recorded at a corresponding location of an optical sensing element 207.

In some embodiments, the display panel 202 includes a cover glass 214 (or cover lens) that protects inner components of the electronic device 100. The sensing region 108 is defined above the cover glass 214. A top surface 216 of the cover glass 214 forms a sensing surface, which provides a contact area for the user's finger 110 or other suitable objects. Inside the sensing region 108, the user's finger 110 may directly touch the top surface 216 or keep a small distance away from the top surface 216 as during a near field sensing. The cover glass 214 may be made of glass, transparent polymeric materials, or other suitable materials.

The display panel 202 includes an illumination layer or display layer 220 under the cover glass 214. The display layer 220 includes an array of light emitting pixels 222. Different light emitting pixels 222 may be configured to emit different colors, such as the ones emitting red light (denoted as 222R), the ones emitting green light (denoted as 222G), or the ones emitting blue light (denoted as 222B). Due to geometry relationships with the sensing region 108, the light emitting pixels 222 can be categorized into two groups, one group directly under the sensing region 108 and another group outside of the sensing region 108. The light emitting pixels 222 outside of the sensing region 108 perform regular display functions, while the light emitting pixels 222 directly under the sensing region 108 perform both regular display functions and illumination function during biometric sensing, depending on applications. In various embodiments, pixel distance D1 between adjacent light emitting pixels 222 is in a range from about 5 micrometers to about 30 micrometers, where other values and ranges are within the scope of this disclosure. In a specific example, the pixel distance D1 may be in a range from about 10 micrometers to about 20 micrometers.

In some embodiments, the display panel 202 further includes a blocking layer 224. The blocking layer 224 is a semitransparent or opaque layer that may be disposed below the display layer 220. Outside of the sensing region 108, the blocking layer 224 is continuous, obscuring components under the display layer 220 from the light emitted by the light emitting pixels 222 and from ambient light. Directly under the sensing region 108, the blocking layer 224 has a plurality of openings 226. Each opening 226 locates between two adjacent light emitting pixels 222. The openings 226 allow the light reflected from the sensing region 108 to travel through. In the illustrated embodiment, there is one opening 226 located between two adjacent light emitting pixels 222. The opening 226 may have a width (or diameter) D2 in a ratio to the pixel distance D1 from about 40% to about 90%, where other values and ranges are within the scope of this disclosure. In some other embodiments, there are two or more openings 226 located between two adjacent light emitting pixels 222. The opening 226 may thus have a width (or diameter) D2 in a ratio to the pixel distance D1 from about 20% to about 40%.

In various embodiments, the display layer 220 may be a LCD display (using backlight with color filters to form RGB pixels), a LED display (e.g., a microLED, in which the pixel material can be inorganic material used in LED), an OLED display, or any other suitable displays. In the illustrated embodiment, the light emitting pixels 222 are organic light emitting diodes (OLED) and the display layer 220 is an OLED display. Examples of an OLED display may include active-matrix OLED (AMOLED), passive-matrix OLED (PMOLED), white OLED (WOLED), and RBG-OLED, and/or other suitable types of OLED. An OLED display is usually thinner, lighter, and more flexible than other types of displays, such as LCD or LED displays. OLED display does not require a back light, since the light can be generated from the organic light emitting material in an OLED, which allows a pixel to be turned completely off. The organic light emitting material can be an organic polymer, such as polyphenylenevinylene and polyfluorene. Due to the organic light emitting material producing its own light, the OLED display can also have a wider viewing angle. This can be in comparison to a LCD display, which works by blocking light that can lead to obstruction of certain viewing angles.

The OLED diodes emit light using a process called electroluminescence, which is a phenomenon where the organic light emitting material can emit light in response to an electric current passing through. In some examples, the OLED diodes can include hole injection layers, hole transport layers, electron injection layers, emissive layers, and electron transport layers. The color of light emitted by an OLED diode depends on the type of organic light emitting material used in the emissive layer. Different colors can be obtained with a variety of chemical structures of the organic light emitting material. For example, the light emitting pixel 222R can be formed with an organic light emitting material that emits red light; the light emitting pixel 222G can be formed with an organic light emitting material that emits green light; and the light emitting pixel 222B can be formed with an organic light emitting material that emits blue light. The intensity of light can depend on the number of emitted photons or the voltage applied on the OLED diodes. In some embodiments, each light emitting pixel 222R, 222G, or 222B is formed with the same organic light emitting material that generates white light, but further includes a red, green, or blue color filter to filter out colors other than the target color, respectively. The color filter can be formed using a cholesteric filter material such as a multilayer dielectric stack that includes materials with different indices of refraction configured to form an optical filter.

As shown in FIG. 2, under the sensing region 108, the light conditioning layer 204 is stacked under the display panel 202. The light conditioning layer 204 includes a semiconductor layer 240 and an optical filtering film 242. In one embodiment, the semiconductor layer 240 comprises a silicon microelectromechanical systems (MEMS) structure. For example, the semiconductor layer 240 comprises a collimator 245 including an array of apertures 246. Each aperture 246 is directly above one or more optical sensing elements 207 in the image sensing layer 206. The array of apertures 246 may be formed by any suitable techniques, such as plasma etching, laser drilling, or the like. The array of apertures 246 conditions incident light reflected from the sensing region 108. With the image sensing layer 206 stacked at the bottom, the display panel 202, especially the relative thick cover glass 214, adds extra vertical distance between the user's finger 110 and the image sensing layer 206, which causes stray light from nearby regions of the user's finger 110 also arrives an optical sensing element 207 together with the light from a small spot directly above. The stray light contributes to image blurring. The array of apertures 246 helps filtering out the stray light and substantially only allows the light from the small spot directly above to be detected, resulting in sharper images.

A metric of the collimator 245 is an aspect ratio of the aperture 246, defined as the height (a) divided by the diameter (e) of the aperture 246. The aspect ratio of the aperture 246 is sufficiently large to allow light rays at normal or near normal incidence to the collimator 245 to pass and reach the optical sensing element 207. Examples of suitable aspect ratio of the aperture 246 are ranging from about 5:1 to about 50:1 and sometimes ranging from about 10:1 to about 15:1. Other values and ranges are within the scope of this disclosure. In an embodiment, the height (a) of the aperture 246 is in a range from about 30 micrometers to 300 micrometers, such as about 150 micrometers. In various embodiments, the collimator 245 may be an opaque layer with array of holes. In some embodiments, the collimator 245 is a monolithic semiconductor layer, such as a silicon layer. Other examples of the collimator 245 may include plastics such as polycarbonate, PET, polyimide, carbon black, inorganic insulating or metallic materials, or SU-8.

As shown in FIG. 2, the light conditioning layer 204 also includes the optical filtering film 242 above the semiconductor layer 240. The optical filtering film 242 selectively absorbs or reflects certain spectrums of incident light, especially components from the ambient light 250, such as infrared light and/or a portion of other visible light (e.g., red light). The optical filtering film 242 helps reducing the optical sensing element 207's sensitivity to ambient light 250 and increasing its sensitivity to the light emitted from the light emitting pixels 222. The optical filtering film 242 may extend continuously and directly above the collimator 245, and have an opening 260 outside of the collimator 245.

In an example, the optical filtering film 242 may include a thin metal layer or a metal oxide layer that absorbs or reflects light in certain spectrums. In another example, the optical filtering film 242 may include dye(s) and/or pigment(s) that absorb or reflect certain light components. Alternatively, the optical filtering film 242 may include several sub-layers or nano-sized features designed to cause interference with certain wavelengths of incident light. In one embodiment, the optical filtering film 242 may include one or more materials like a silicon oxide, a titanium oxide, or another metal oxide.

The optical filtering film 242 may be deposited on a dielectric layer 241, which may be a buried oxide layer on the semiconductor layer 240. In one embodiment, the buried oxide layer 241 may include one or more materials like a thermal oxide, a plasma enhanced oxide (PEOX), a high-density-plasma (HDP) oxide, etc. In addition, the light conditioning layer 204 also includes a passive oxide layer 255 below the semiconductor layer 240. In one embodiment, the passive oxide layer 255 may include one or more materials like a PEOX, a HDP oxide, etc.

The ambient light 250, such as sun light, may include abundant infrared light components, which can penetrate the user's finger 110 or other objects in the sensing region 108 and arrive the optical sensing elements 207. In contrast to human eyes, CMOS and CCD image sensors are usually also sensitive to infrared light (including near infrared light). The infrared light penetrating the user's finger 110 does not carry biometric information, which reduces contrasts of the useful reflected light emitted from the light emitting pixels 222. Such infrared light can be considered as a source of noise in the pixel image generated by the image sensing layer 206. Therefore, SNR of the incident light is reduced due to the unwanted infrared light. When ambient light 250 becomes stronger, the infrared light may even saturate the optical sensing elements 207 and SNR may be below a threshold for any meaningful biometric detection. For example, the biometric detection function may fail when the electronic device is under strong sunlight. In some embodiments, the optical filtering film 242 is an infrared light (IR) filter, also known as an infrared light cut-off filter (IRCF), such that infrared light can be substantially blocked, while visible light emitted from the light emitting pixels 222 can transmit through the IRCF filter. The dielectric layer 241 may include a single or multiple material layers. In some embodiments, the dielectric layer 241 may include an anti-reflection (AR) film, and a red light reduction film to weaken intensity of red light components in the incident light.

The image sensing layer 206 in this example includes a substrate 268, a plurality of optical sensing elements 207 in the substrate 268, and bond pads 264 in the substrate 268. Each bond pad may be a metal pad including conductive material. As shown in FIG. 2, the stack of the passive oxide layer 255, the semiconductor layer 240, the buried oxide layer 241 and the optical filtering film 242 may further have a few openings 260. The openings 260 allow some conductive features, e.g. bond wires 262, to interconnect at least one of the bond pads 264 on the top surface of the image sensing layer 206 to external circuits, such as a processor of the electronic device 100. The bond pads 264 route to control signal lines and power/ground lines embedded in the image sensing layer 206. The image sensing layer 206 may further include alignment marks for alignment control during fabrication and assembly. In other embodiments, the alignment marks are located at the passive oxide layer 255 or a metal/bond pad layer of the image sensing layer 206 for alignment control during fabrication and assembly.

In one embodiment, the semiconductor layer 240 has a thickness (a) of about 50 to 200 micrometers. In one embodiment, the passive oxide layer 255 has a thickness (b) of about 400 to 2000 nanometers. In one embodiment, the buried oxide layer 241 has a thickness (c) of about 1000 to 2000 nanometers. In one embodiment, the optical filtering film 242 has a thickness (d) of about 1 to 5 micrometers. In one embodiment, each aperture 246 of the collimator 245 has a diameter of about 5 to 30 micrometers. According to various embodiments, the openings 260 of the passive oxide layer 255, the semiconductor layer 240 and the buried oxide layer 241 have different diameters. For example, the opening of the buried oxide layer 241 has a diameter (f) of about 100 to 140 micrometers; the opening of the semiconductor layer 240 has a diameter (g) of about 80 to 120 micrometers; and the opening of the passive oxide layer 255 has a diameter (h) of about 60 to 100 micrometers.

In one embodiment, a method for capturing a biometric image from an input object illuminated by a display panel integrated with a light conditioning layer is described below. The screen of the electronic device 100 may be first in a lock status. A prompt is displayed, where the prompt may be an icon, such as a fingerprint icon or an instruction text, which highlights a sensing region 108 on the screen. The prompt is shown by light emitting pixels 222 under the sensing region 108. The light emitting pixels 222 can be OLED diodes. The light emitting pixels 222 outside of the sensing region 108 may be turned off in the lock status or display preset screen saver images. Then, when the user's finger 110 stays steady in the sensing region 108 for more than a predetermined time, such as the user holding a finger steady for about one hundred milliseconds, a biometric detection mode begins. Otherwise, the method goes back to wait for a new user input.

In the biometric detection mode, the prompt shown on the screen is turned off and the light emitting pixels 222 under the sensing region 208 start to illuminate the user's finger 110. The light 270 emitted from the light emitting pixels 222 can travel through the cover glass 214 and arrives at the user's finger 110. The user's finger 110 can include ridges 272 and valleys 274. The ridges 272 of the finger can reflect more light due to a closer distance to the top surface 216 than the valleys 274, and the valleys 274 can reflect less light. The light 270 is in turn reflected back towards the light conditioning layer 204.

Then, the optical filtering film 242 can filter certain spectrums of light. In some embodiments, the optical filtering film 242 is an infrared light cut-off filter, which filters (or reduces) infrared light component from the incident light, such as by absorbing or reflecting. The ambient light 250, such as sunlight, is the major source of infrared light. The infrared light may easily penetrate the user's finger 110. Thus the infrared light does not carry useful information of biometric characteristics of the finger and can be considered as part of the noise. Blending the infrared light component from the ambient light with the reflected light from the light emitting pixels reduces the sensitivity of the optical sensing elements 207. By filtering the infrared light before sensing, SNR of the incident light will be increased. In some other embodiments, the optical filtering film 242 may target light in certain spectrums other than infrared light, for example, red light in the visible spectrum or ultra violet light. The light filtering profile of the optical filtering film 242 may be formulated to give a particular appearance of color, texture, or reflective quality thereby allowing for optimized filtering performance. In some embodiments, the optical filtering film 242 is an infrared light cut-off filter and there is a separate film stacked under or above for filtering red light to reduce ghost image.

Then the collimator 245 filters stray light components in the light 270. With high aspect ratio of the apertures 246, the collimator 245 only allows light rays reflected from the sensing region 108 at normal or near normal incidence to the collimator 245 to pass and eventually reach the image sensing layer 206. The optical sensing element 207 can be used to measure the intensity of light and convert the measured intensity into pixel image of the input object, such as the user's finger 110. On the other hand, stray light with a larger angle from normal, strike the collimator 245, either on its top surface or at surface within the apertures 246 (e.g., aperture sidewalls) and are blocked and prevented from reaching the image sensing layer 206 below. The aspect ratio of the apertures 246 is sufficiently large to prevent stray light from traveling through the collimator 245, such as from about 5:1 to about 50:1.

The image sensing layer 206 then acquires a fingerprint image. The optical sensing elements 207 inside the image sensing layer 206 can convert the incident light into electrical outputs. Each optical sensing element 207's output may correspond to one pixel in the fingerprint image. The optical sensing elements 207 may comprise color image sensors and/or monochromatic image sensors. In some embodiments, each of the optical sensing elements 207 may be configured to correspond with specific light wavelengths, such as a sensor element under a red light emitting pixel 222R for sensing a red light wavelength, a sensor element under a green light emitting pixel 222G for sensing a green light wavelength, and a sensor element under a blue light emitting pixel 222B for sensing a blue light wavelength.

The acquired fingerprint image is compared with an authentic reference image previously stored in a memory. If the fingerprint images match, the screen is unlocked. The light emitting pixels 222 under the sensing region 108 will stop illumination and join the other light emitting pixels 222 outside of the sensing region 108 to start display regular desktop icons as in an unlock status. If the fingerprint images do not match, the method goes back to wait for new biometric detection.

Figure 3C:
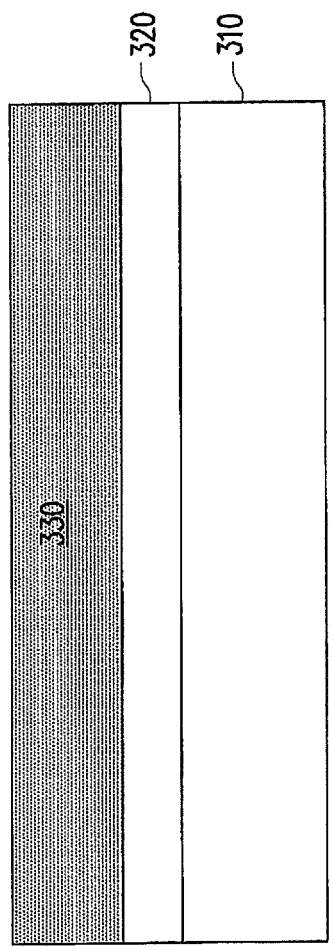

FIGS. 3A, 3B, 3C, and 3D illustrate cross-sectional views of an exemplary MEMS wafer structure during various fabrication stages, in accordance with some embodiments of the present disclosure. FIG. 3A is a cross-sectional view of a carrier substrate 310, which is provided at one of the various stages of fabrication, according to some embodiments of the present disclosure. The carrier substrate 310 in FIG. 3A may be formed of a semiconductor material, e.g. silicon.

FIG. 3B is a cross-sectional view of a MEMS wafer including a buried layer 320, which is provided at one of the various stages of fabrication, according to some embodiments of the present disclosure. In one embodiment, the buried layer 320 is formed by depositing an oxide material onto the carrier substrate 310. The oxide material may include one or more of: a thermal oxide, a plasma enhanced oxide (PEOX), a high-density-plasma (HDP) oxide, etc.

FIG. 3C is a cross-sectional view of a MEMS wafer including a semiconductor layer 330, which is provided at one of the various stages of fabrication, according to some embodiments of the present disclosure. In one embodiment, the semiconductor layer 330 is formed by depositing a semiconductor material, e.g. silicon, onto the buried layer 320.

Figure 3D:
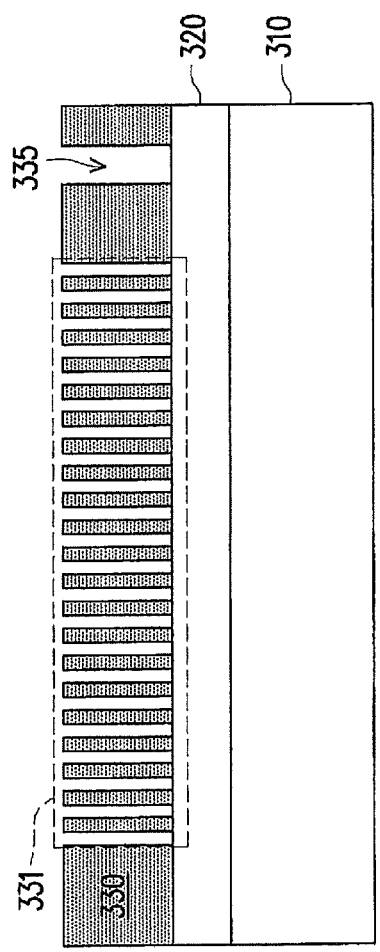

FIG. 3D is a cross-sectional view of a MEMS wafer including a collimator 331, which is provided at one of the various stages of fabrication, according to some embodiments of the present disclosure. In one embodiment, the collimator 331 includes a plurality of apertures formed by etching the semiconductor layer 330. The etching may include a plasma etching, e.g. a deep reactive-ion etching (DRIE). As shown in FIG. 3D, based on the etching, an opening 335 is formed outside the collimator 331, e.g. outside the plurality of apertures. In another embodiment, the MEMS wafer may be formed directly based on a silicon on insulator (SOI) wafer which includes a silicon-insulator-silicon structure. In that case, the collimator 331 and the opening 335 can be formed in the upper silicon layer of the silicon-insulator-silicon structure.

Figure 4C:
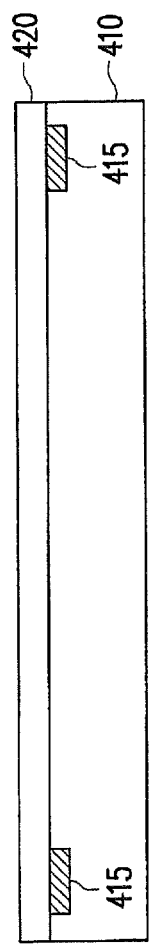

FIGS. 4A, 4B, 4C, and 4D illustrate cross-sectional views of an exemplary CIS wafer structure during various fabrication stages, in accordance with some embodiments of the present disclosure. FIG. 4A is a cross-sectional view of a substrate 410, which is provided at one of the various stages of fabrication, according to some embodiments of the present disclosure. The substrate 410 in FIG. 4A may be formed of a semiconductor material, e.g. silicon. In one embodiment, the substrate 410 includes one or more image sensors (not shown).

FIG. 4B is a cross-sectional view of a CIS wafer including bond pads 415, which are provided at one of the various stages of fabrication, according to some embodiments of the present disclosure. In one embodiment, the bond pads 415 are formed outside the pattern of the image sensors. Each bond pad 415 may comprise a conductive material.

FIG. 4C is a cross-sectional view of a CIS wafer including a passive oxide layer 420, which is provided at one of the various stages of fabrication, according to some embodiments of the present disclosure. In one embodiment, the passive oxide layer 420 is formed by depositing an oxide material onto the substrate 410. The oxide material may include one or more of: a plasma enhanced oxide (PEOX), a high-density-plasma (HDP) oxide, etc.

Figure 4D:
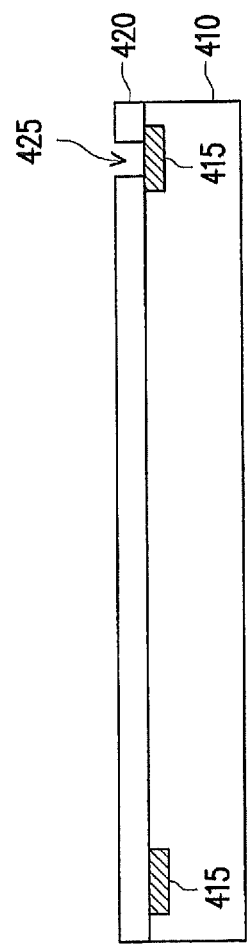

FIG. 4D is a cross-sectional view of a CIS wafer including an opening 425 of the passive oxide layer 420, which is provided at one of the various stages of fabrication, according to some embodiments of the present disclosure. In one embodiment, the opening 425 of the passive oxide layer 420 is formed by etching the passive oxide layer 420 to expose at least one of the bond pads 415. As shown in FIG. 4D, based on the etching, the opening 425 is formed directly on one of the bond pads 415 to expose it.

Figure 5A:
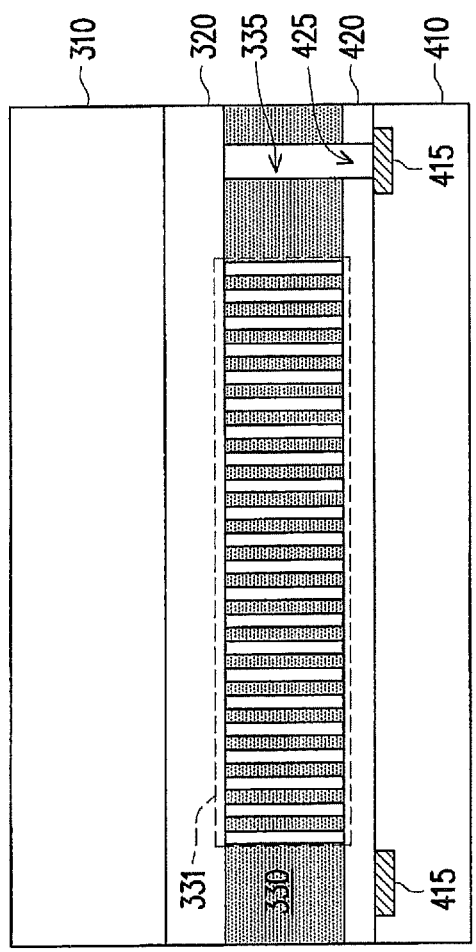
FIGS. 5A, 5B, 5C, 5D and 5E illustrate cross-sectional views of an electronic device including an optical sensor during various fabrication stages, in accordance with some embodiments of the present disclosure.

FIGS. 5A, 5B, 5C, 5D and 5E illustrate cross-sectional views of an electronic device including an optical sensor during various fabrication stages, in accordance with some embodiments of the present disclosure. FIG. 5A is a cross-sectional view of an electronic device including both the MEMS wafer formed according to FIGS. 3A-3D and the CIS wafer formed according to FIGS. 4A-4D, which is provided at one of the various stages of fabrication, according to some embodiments of the present disclosure. The electronic device structure in FIG. 5A may be formed by bonding the MEMS wafer onto the CIS wafer, wherein the collimator 331 including the plurality of apertures of the MEMS wafer is bonded on and in contact with the passive oxide layer 420 of the CIS wafer. As such, the carrier substrate 310 is above the buried layer 320 after the bonding. In one embodiment, the bonding of the two wafers is based on a fusion bonding with alignment marks, such that the opening 325 of the semiconductor layer 330 outside the plurality of apertures is aligned with the opening 425 of the passive oxide layer 420, as shown in FIG. 5A. Accordingly, the collimator 331 of the semiconductor layer 330 will also be aligned with the image sensors in the substrate 410. The direct fusion bonding process may include preprocessing, pre-bonding at a lower temperature and annealing at a higher temperature.

Figure 5B:
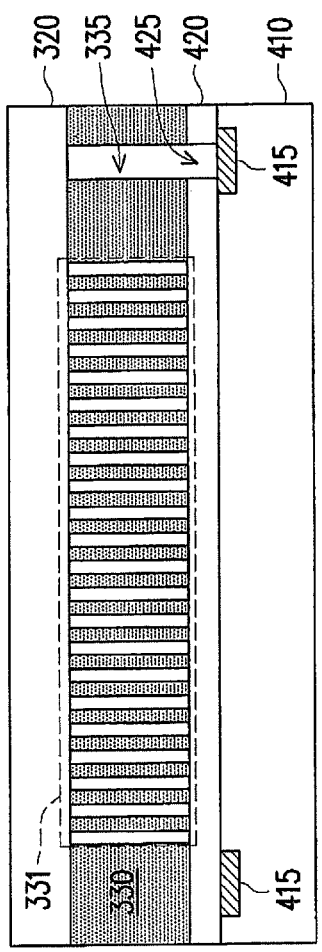

As shown in FIG. 5B, the carrier substrate 310 on the buried layer 320 is removed after the bonding, according to some embodiments of the present disclosure. This may be performed based on grinding and chemical mechanical polishing (CMP), or a thinning process, stopping on the buried layer 320.

Figure 5C:
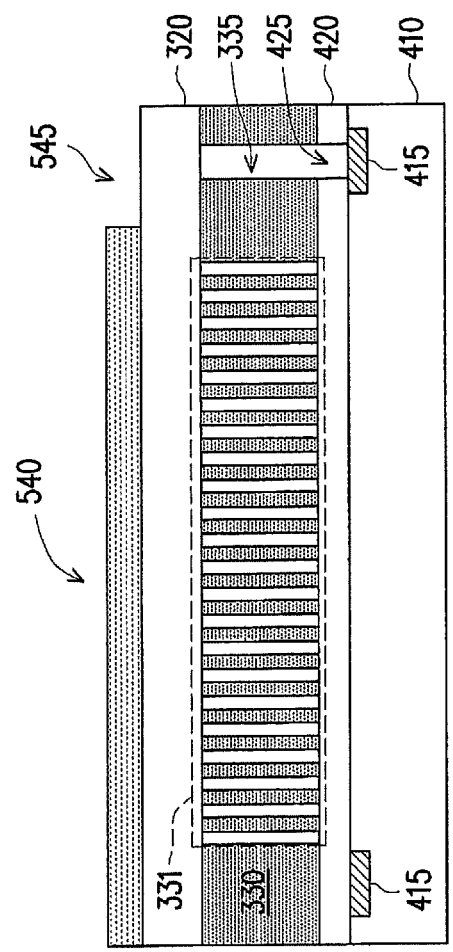

FIG. 5C is a cross-sectional view of an electronic device including an infrared cut-off filter (IRCF) 540, which is provided at one of the various stages of fabrication, according to some embodiments of the present disclosure. In one embodiment, the IRCF 540 is an infrared light filtering film formed by depositing one or more oxide materials onto the buried layer 320. As shown in FIG. 5C, the IRCF 540 has an opening 545 directly above one bond pad on a top surface of the substrate 410, i.e. directly above the openings 335, 425. The opening 545 may be formed by etching the IRCF 540, or by a lift-off method, where a light mask is put at the location of the opening 545 during the deposition of the IRCF 540 to form the opening 545 after depositing the IRCF 540.

Figure 5D:
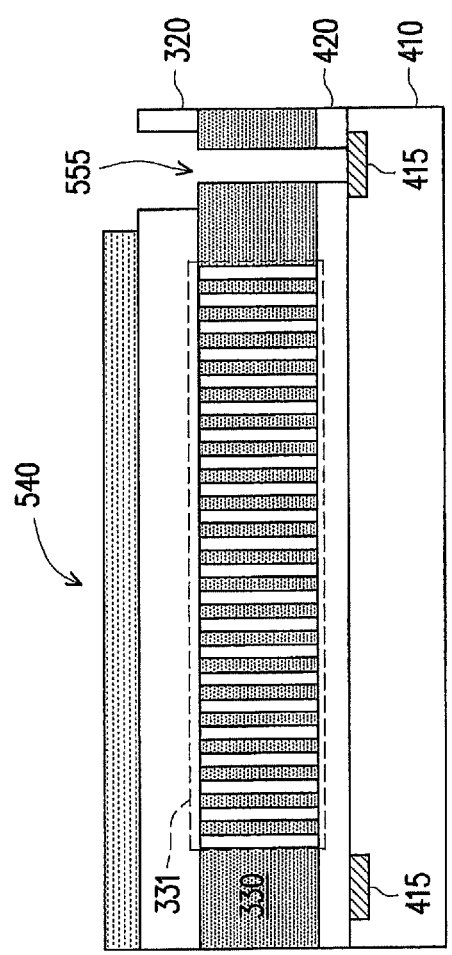

As shown in FIG. 5D, a partial dicing is performed on the buried layer 320 via the opening 545 to form a trench 555 extending from the opening 545 to the exposed bond pad 415. In the illustrated embodiment, one bond pad is exposed. In other embodiments, more bond pads or each bond pad is exposed. The IRCF 540 is formed with a pattern such that the exposed bond pad is outside of the pattern.

As such, the IRCF 540 is formed after the MEMS structure, e.g. the collimator 331 including the plurality of apertures, is formed and bonded onto the CIS wafer. The formation of the IRCF 540 in this manner will not impact the optical property of the image sensors of the device. For example, to have a better infrared light filtering effect, the IRCF 540 needs to be thicker. But a thick IRCF, e.g. thicker than 3 micrometers, may induce a high stress degradation in the substrate 410 and the passive oxide layer 420, which causes a high wafer bow at the top surface of the passive oxide layer 420, i.e. making the top surface of the passive oxide layer 420 non-smooth. If the wafer bonding is performed after depositing the thick IRCF 540, the fusion bonding performance will be seriously degraded due to the non-smoothness of the wafer surface. In contrast, in the disclosed method where the IRCF 540 is formed after the wafer bonding, no fusion bonding challenge by the formation of the IRCF 540.

In addition, if the MEMS structure, e.g. the collimator 331 including the plurality of apertures, is formed after the semiconductor layer 330 is bonded onto the CIS wafer, the pixel performance of the CIS wafer will be impacted by the plasma irradiation during the formation of the MEMS structure. This is because a long time of plasma irradiation is typically needed for etching the semiconductor layer 330 to form the MEMS structure, due to the thickness of the semiconductor layer 330. As such, the long time of plasma irradiation will cause process charging and plasma induced damage (PID) effects on the CIS wafer, including the image sensors in the substrate 410, under the semiconductor layer 330. In contrast, in the disclosed method where the MEMS structure is formed on a separate MEMS wafer before the wafer bonding, the process charging and plasma induced damage (PID) effects will be removed or at least mitigated dramatically in the CIS wafer.

Figure 5E:
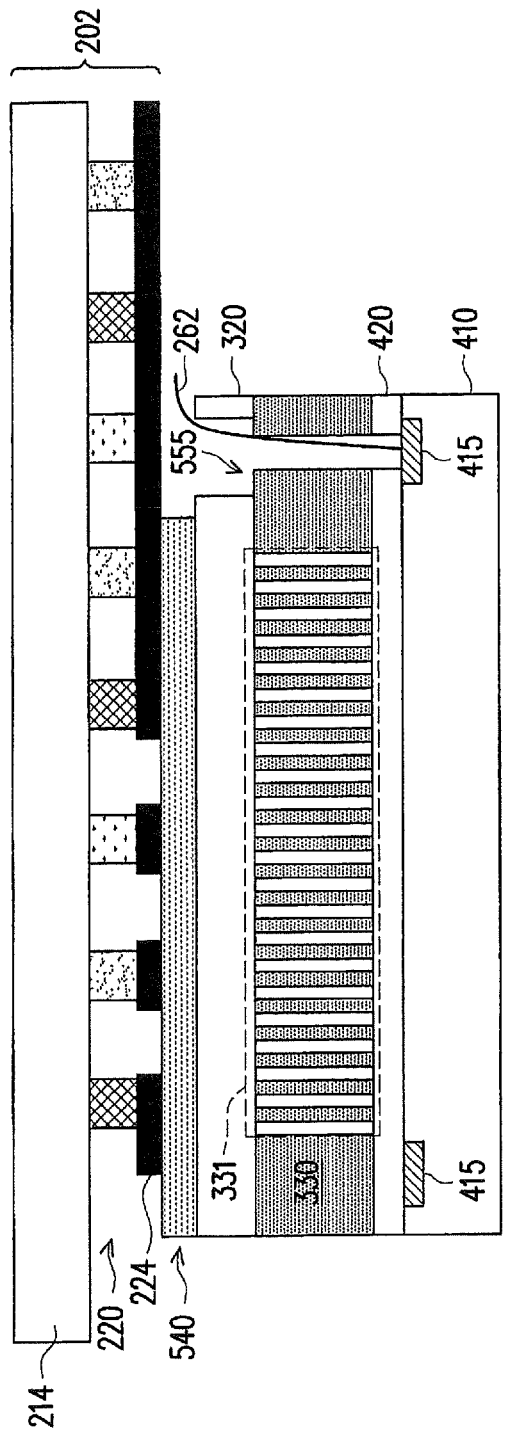

As shown in FIG. 5E, further processes may be performed in order to complete the fabrication of the electronic device. For example, the exposed bond pad 415 may be bonded with conductive features, such as bond wires 262. The bond wires 262 extend through the trench 555 and the opening of the IRCF 540, and routes internal routings in the semiconductor substrate 410 to external control signals, data lines, and power lines. In addition, the display panel 202 may also be assembled above the IRCF 540. The display panel 202 may include the cover glass 214, the display layer 220, and/or the blocking layer 224.

Figure 6:
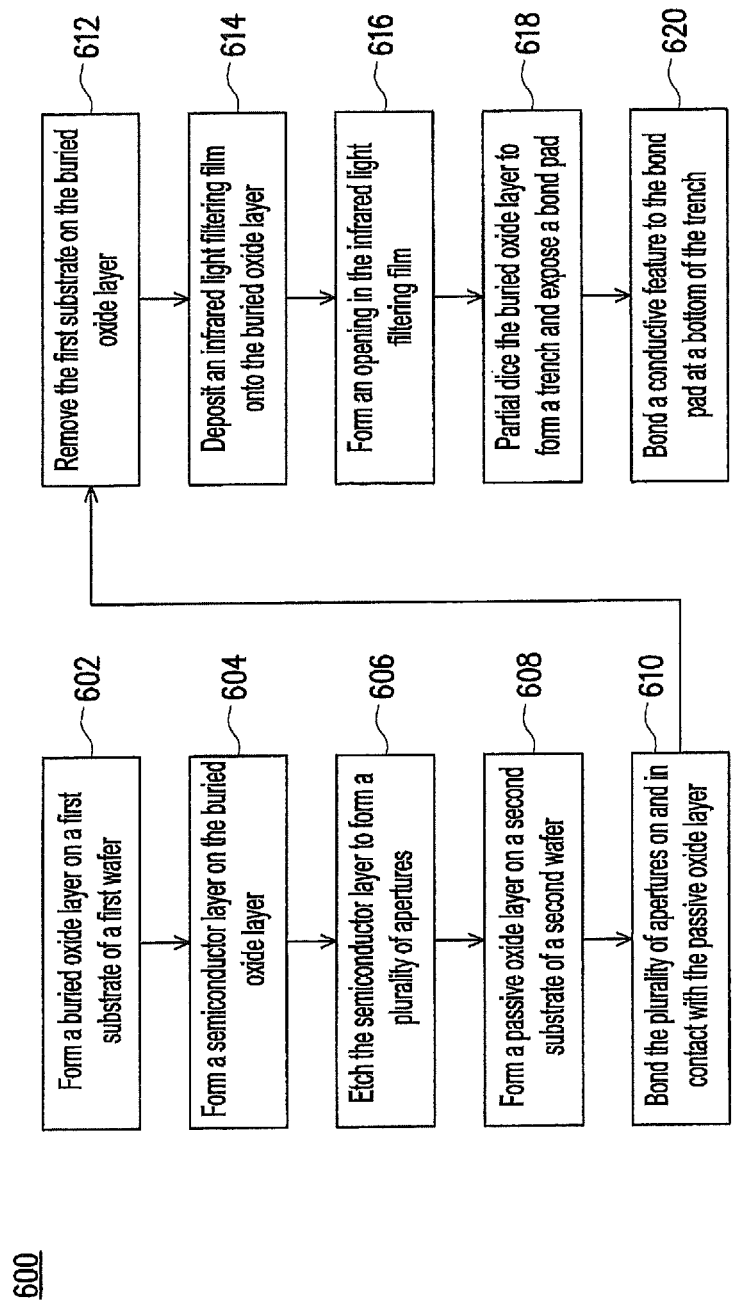
FIG. 6 illustrates a flowchart of an exemplary method for forming a sensing apparatus, in accordance with some embodiments of the present disclosure.

FIG. 6 illustrates a flowchart of an exemplary method 600 for forming a sensing apparatus, in accordance with some embodiments of the present disclosure. At operation 602, a buried oxide layer is formed on a first substrate of a first wafer. At operation 604, a semiconductor layer is formed on the buried oxide layer. At operation 606, the semiconductor layer is etched to form a collimator including a plurality of apertures. At operation 608, a passive oxide layer is formed on a second substrate of a second wafer. At operation 610, the collimator including a plurality of apertures is bonded on and in contact with the passive oxide layer, such that the first wafer and the second wafer are bonded together. The first substrate is on the buried oxide layer after the bonding.

At operation 612, the first substrate on the buried oxide layer is removed, e.g. by a silicon thinning process. At operation 614, an infrared light filtering film is deposited onto the buried oxide layer. At operation 616, an opening is formed in the infrared light filtering film. At operation 618, the buried oxide layer is cut by partial dicing to form a trench and expose a bond pad in the second substrate. At operation 620, a conductive feature is bonded to the bond pad at a bottom of the trench.

In some embodiments, a sensing apparatus is disclosed. The sensing apparatus includes: an image sensor; a collimator above the image sensor, wherein the collimator includes an array of apertures; and an optical filtering layer above the collimator, wherein the optical filtering layer is configured to filter a portion of light to be transmitted into the array of apertures.

In some embodiments, a device is disclosed. The device includes: a touch display panel; a light conditioning layer under the touch display panel, wherein the light conditioning layer comprises a collimator and an infrared light filter above the collimator; and an image sensing layer under the light conditioning layer, the image sensing layer is configured to sense light emitted from the touch display panel.

In some embodiments, a method for forming a sensing apparatus is disclosed. The method includes: forming a semiconductor layer above a first substrate of a first wafer; etching the semiconductor layer to form a plurality of apertures; providing a second substrate of a second wafer, the second substrate including at least one image sensor; bonding the first wafer onto the second wafer to form a bonded wafer; and depositing an infrared light filtering film above the bonded wafer.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:
1. A sensing apparatus, comprising:
an image sensor;
a collimator above the image sensor, wherein the collimator includes an array of apertures;

an optical filtering layer above the collimator, wherein the optical filtering layer is configured to filter a portion of light to be transmitted into the array of apertures, wherein the optical filtering layer extends continuously directly above the collimator and has an opening outside of the collimator; and a conductive feature coupled to the image sensor, wherein the conductive feature extends through the opening.

2. The sensing apparatus of claim 1, wherein the portion of light is infrared light.

3. The sensing apparatus of claim 1, wherein the optical filtering layer includes metal oxide.

4. The sensing apparatus of claim 1, further comprising a passive oxide layer above the image sensor and below the collimator.

5. The sensing apparatus of claim 1, further comprising a buried oxide layer on the collimator and below the optical filtering layer.

6. The sensing apparatus of claim 1, wherein the optical filtering layer includes a plurality of sub-layers and has a total thickness greater than 1 micrometer.

7. The sensing apparatus of claim 1, further comprising:
an illumination layer above the optical filtering layer, wherein the illumination layer includes a plurality of light emitting pixels, and a portion of the plurality of light emitting pixels is configured to illuminate an object placed above the illumination layer.

8. The sensing apparatus of claim 7, further comprising:
a blocking layer between the illumination layer and the optical filtering layer, wherein the blocking layer has a plurality of openings under the portion of the plurality of light emitting pixels, the opening allowing light reflected from the object to pass through.

9. The sensing apparatus of claim 1, wherein the buried oxide layer has a thickness in a range of 1000 to 2000 nanometers.

10. A device, comprising:
a touch display panel;
a light conditioning layer under the touch display panel, wherein the light conditioning layer comprises a collimator, an infrared light filter above the collimator, and a passive oxide layer below the collimator; and
an image sensing layer under the light conditioning layer, the image sensing layer is configured to sense light emitted from the touch display panel;
a conductive feature coupled to the image sensor, wherein the conductive feature extends through the opening.

11. The device of claim 10, wherein a portion of the touch display panel is configured as a fingerprint sensing region.

12. The device of claim 10, wherein the touch display panel includes a plurality of organic light emitting diodes (OLED).

13. The device of claim 10, wherein the light conditioning layer further comprises a buried oxide layer on the collimator and below the infrared light filter.

14. The device of claim 10, wherein the collimator includes an array of apertures.

15. A method for forming a sensing apparatus, comprising:
forming a semiconductor layer above a first substrate of a first wafer;
etching the semiconductor layer to form a plurality of apertures;
providing a second substrate of a second wafer, the second substrate including at least one image sensor;
forming a buried oxide layer on the first substrate of the first wafer before the bonding, wherein the plurality of apertures is formed on the buried oxide layer; and
forming a conductive feature coupled to the image sensor, wherein the conductive feature extends through the opening.

16. The method of claim 15, further comprising:
bonding the first wafer onto the second wafer to form a bonded wafer; and depositing an infrared light filtering film above the bonded wafer;
forming a passive oxide layer on the second substrate of the second wafer, wherein bonding the first wafer onto the second wafer includes bonding the plurality of apertures on and in contact with the passive oxide layer.

17. The method of claim 16, wherein bonding the first wafer onto the second wafer is based on fusion bonding with alignment marks, such that an opening of the semiconductor layer outside the plurality of apertures is aligned with an opening of the passive oxide layer.

18. The method of claim 17, further comprising removing the first substrate on the buried oxide layer after the bonding.

19. The method of claim 18, wherein the infrared light filtering film is deposited onto the buried oxide layer after the removing of the first substrate.

20. The method of claim 18, further comprising:
forming an opening in the infrared light filtering film, wherein the opening is directly above a bond pad on a top surface of the second substrate;
partial dicing the buried oxide layer via the opening to form a trench extending from the opening to the bond pad; and
bonding a conductive feature to the bond pad, the conductive feature extending through the opening.

* * * * *